United States Patent
Jeon

(10) Patent No.: US 11,257,228 B1
(45) Date of Patent: Feb. 22, 2022

(54) METHOD FOR IMAGE REGISTRATION

(71) Applicant: SI Analytics Co., Ltd, Daejeon (KR)

(72) Inventor: Yongjin Jeon, Daejeon (KR)

(73) Assignee: SI Analytics Co., Ltd., Daejeon (KR)

( * ) Notice: Subject to any disclaimer, the term of this patent is extended or adjusted under 35 U.S.C. 154(b) by 0 days.

(21) Appl. No.: 17/342,901

(22) Filed: Jun. 9, 2021

(30) Foreign Application Priority Data

Apr. 9, 2021 (KR) ........................ 10-2021-0046357

(51) Int. Cl.
*G06T 7/33* (2017.01)
*G06T 3/00* (2006.01)
*G06K 9/62* (2006.01)

(52) U.S. Cl.
CPC ............ *G06T 7/337* (2017.01); *G06K 9/6223* (2013.01); *G06K 9/6226* (2013.01); *G06T 3/0093* (2013.01); *G06T 2207/10032* (2013.01); *G06T 2207/20021* (2013.01)

(58) Field of Classification Search
CPC .................. G06T 7/337; G06T 3/0093; G06T 2207/10032; G06T 2207/20021; G06K 9/6223; G06K 9/6226
See application file for complete search history.

(56) References Cited

U.S. PATENT DOCUMENTS 10,460,458 B1 * 10/2019 Vakil ........................ G06T 7/37
2017/0076438 A1 * 3/2017 Kottenstette ........... G06K 9/627

FOREIGN PATENT DOCUMENTS

| KR | 100321771 B1 | 3/2002 |
|---|---|---|
| KR | 1020050104663 A | 11/2005 |
| KR | 1020100008886 A | 1/2010 |
| KR | 101175097 B1 | 8/2012 |
| KR | 1020130013966 A | 2/2013 |
| KR | 101404640 B1 | 6/2014 |
| KR | 1020140100054 A | 8/2014 |
| KR | 101440826 B1 | 9/2014 |
| KR | 1020190027165 A | 3/2019 |
| KR | 102196749 B1 | 12/2020 |

OTHER PUBLICATIONS

A robust image registration, Bo et al, 2012 (Year: 2012).*

* cited by examiner

*Primary Examiner* — Jianxun Yang
(74) *Attorney, Agent, or Firm* — Umberg Zipser LLP; Ryan Dean

(57) ABSTRACT

Disclosed is a method for image registration performed by a computing device including at least one processor according to some exemplary embodiments of the present disclosure. The method for image registration may include: determining whether to perform preprocessing on a first image and a second image, based on at least one of the number of first pixels of the first image or the number of second pixels of the second image; when performing the preprocessing, generating a first divided image and a second divided image from each of the first image and the second image through a preprocessing process; and registering the first image and the second image, based on the first divided image and the second divided image.

16 Claims, 8 Drawing Sheets

METHOD FOR IMAGE REGISTRATION

CROSS-REFERENCE TO RELATED APPLICATIONS

This application claims priority to and the benefit of Korean Patent Application No. 10-2021-0046357 filed in the Korean Intellectual Property Office on Apr. 9, 2021, the entire contents of which are incorporated herein by reference.

TECHNICAL FIELD

The present disclosure relates to an image processing method, and particularly, to a method for registering an image.

BACKGROUND ART

Image registration is performed through a processing process that extracts a feature from an object included in each of a plurality of images and matches the extracted features each other. In this case, the process of extracting the feature from each of the plurality of images may be generally performed through a Scale Invariant Feature Transform (SIFT) algorithm. In addition, the process of matching the extracted feature each other may be performed through Brute-Force (BF) matcher, etc.

Specifically, the SIFT algorithm as an algorithm that extracts a feature which is not changed with respect to a size and rotation of an image is an algorithm that can find a feature point even when sizes of different images are different and any one image rotates. In addition, when the feature point is extracted through the SIFT algorithm, feature points of one image and the other image may be matched through the BF matcher algorithm.

Meanwhile, in recent years, satellite images having high resolution and capable of containing a wide range have been acquired with the development of satellite technology in addition to the development of camera performance. Even to register the satellite image, a process of extracting the feature point through a model based on the SIFT algorithm or an SIFT algorithm based model is required. However, since the satellite image has too many objects, it may be difficult to extract the feature point from the image through the SIFT based algorithm or model.

SUMMARY OF THE INVENTION

The present disclosure is contrived in response the above-described background art, and has been made in an effort to provide a method for registering a large-sized image such as a satellite image.

However, technical objects of the present disclosure are not restricted to the technical object mentioned as above. Other unmentioned technical objects will be apparently appreciated by those skilled in the art by referencing to the following description.

An exemplary embodiment of the present disclosure provides a method for image registration performed by a computing device including at least one processor. The method for image registration may include: determining whether to perform preprocessing on a first image and a second image, based on at least one of the number of first pixels of the first image or the number of second pixels of the second image; when performing the preprocessing, generating a first divided image and a second divided image from each of the first image and the second image through a preprocessing process; and registering the first image and the second image, based on the first divided image and the second divided image.

The determining whether to perform preprocessing may include, when at least one of the number of the first pixels or the number of the second pixels is equal to or greater than a preset value, determining to perform the preprocessing.

The determining whether to perform preprocessing may include, when the number of the first pixels and the number of the second pixels are less than a preset value, registering the first image and the second image without performing the preprocessing.

The first image may be a satellite image, and the second image may be a satellite image generated after the first image is generated.

The preprocessing process may include: generating a first sub image by reducing the first image to a preset size, and generating a second sub image by reducing the second image to a preset size; extracting at least one first feature point from the first sub image, and extracting at least one second feature point from the second sub image; determining at least one first matching point matched by comparing the at least one first feature point and the at least one second feature point; and generating the first divided image from the first image and generating the second divided image from the second image, based on the at least one first matching point.

The preprocessing process may further include: when the at least one first matching point is determined, removing remaining feature points other than the at least one first matching point from each of the first sub image and the second sub image; and the generating the first divided image from the first image and generating the second divided image from the second image, based on the at least one first matching point may include generating the first divided image from the first image based on the first sub image from which the remaining feature points have been removed, and generating the second divided image from the second image based on the second sub image from which the remaining feature points have been removed.

The generating the first divided image from the first image and generating the second divided image from the second image, based on the at least one first matching point may include: generating at least one cluster in each of the first sub image and the second sub image by performing clustering on the at least one first matching point; and generating the first divided image and the second divided image, based on the at least one cluster.

The generating the first divided image and the second divided image, based on the at least one cluster may include: determining a major cluster having the highest density of the at least one first matching point among the at least one cluster; determining first area information on an area in which the major cluster is disposed in the first sub image, and determining second area information on an area in which the major cluster is disposed in the second sub image; and generating the first divided image from the first image using the first area information, and generating the second divided image from the second image using the second area information.

The preprocessing process may further include: when the at least one cluster is generated, removing a shortage cluster in which the number of the at least one first matching point is less than the preset number among the at least one cluster from each of the first sub image and the second sub image; and the generating of the first divided image and the second divided image, based on the at least one cluster may include: determining third area information on an area in which the at least one cluster is disposed in the first sub image from which the shortage cluster is removed, and determining fourth area information on an area in which the at least one cluster is disposed in the second sub image from which the shortage cluster is removed; and generating the first divided image from the first image using the third area information, and generating the second divided image from the second image using the fourth area information.

The generating of at least one cluster in each of the first sub image and the second sub image by performing clustering on the at least one first matching point may include generating the at least one cluster in each of the first sub image and the second sub image according to a density-based clustering (Density-based spatial clustering of applications with noise, DBSCAN) technique using the density of the at least one first matching point.

The generating of at least one cluster in each of the first sub image and the second sub image by performing clustering on the at least one first matching point may include generating at least one cluster in each of the first sub image and the second sub image according to a K-means clustering technique which enables forming a cluster consisting of the at least one first matching point.

The registering of the first image and the second image, based on the first divided image and the second divided image may include: extracting at least one third feature point from the first divided image, and extracting at least one fourth feature point from the second divided image; calculating a matching parameter, based on at least one second matching point matched by comparing the at least one third feature point and the at least one fourth feature point; warping the second image, based on the matching parameter; and registering the first image and a warped second image.

The extracting of at least one third feature point from the first divided image, and extracting at least one fourth feature point from the second divided image may include repeatedly performing the preprocessing process until each of the first divided image and the second divided image can be inputted into a neural network-based feature point extraction model.

The first area information may include information on a first coordinate point corresponding to the center of the major cluster in the first sub image and information on a size at which the major cluster is disposed, and the second area information may include information on a second coordinate point corresponding to the center of the major cluster in the second sub image and information on a size at which the major cluster is disposed.

The third area information may include information on at least one third coordinate point corresponding to the center of each of the at least one cluster and information on a size in which each of the at least one cluster is disposed in the first sub image from which the shortage cluster is removed, and the fourth area information may include information on at least one fourth coordinate point corresponding to the center of each of the at least one cluster and information on a size in which each of the at least one cluster is disposed in the second sub image from which the shortage cluster is removed.

When performing the preprocessing, the generating of a first divided image and a second divided image from each of the first image and the second image through a preprocessing process may include: determining a size of the first divided image; and generating the second divided image to correspond to the size of the first divided image, based on the size of the first divided image.

Another exemplary embodiment of the present disclosure provides a non-transitory computer readable medium storing a computer program, wherein the computer program performs the following method for registering an image when executed by one or more processors and the operations may include determining whether to perform preprocessing on a first image and a second image, based on at least one of the number of first pixels of the first image or the number of second pixels of the second image; when performing the preprocessing, generating a first divided image and a second divided image from each of the first image and the second image through a preprocessing process; and registering the first image and the second image, based on the first divided image and the second divided image.

Still another exemplary embodiment of the present disclosure provides a server that already processes registration. The server may include: a communication unit receiving a plurality of images; a storage unit storing the plurality of images; and a processor determining whether to perform preprocessing on a first image and a second image, based on at least one of the number of first pixels of the first image or the number of second pixels of the second image, and the processor may be further configured to when performing the preprocessing, generate a first divided image and a second divided image from each of the first image and the second image through a preprocessing process, and register the first image and the second image based on the first divided image and the second divided image.

Technical solving means which can be obtained m the present disclosure are not limited to the aforementioned solving means and other unmentioned solving means will be clearly understood by those skilled in the art from the following description.

According to some exemplary embodiments of the present disclosure, a method is intended to be provided, which can perform registration even in a large-sized image such as a satellite image.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

DETAILED DESCRIPTION

Figure 1:
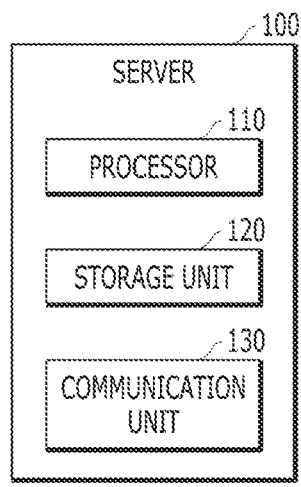
FIG. 1 is a block diagram for describing an example of a server according to some exemplary embodiments of the present disclosure.

Various embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an embodiment disclosed in the present disclosure, a detailed description of related known technologies will be omitted if it is determined that the detailed description makes the gist of the embodiment of the present disclosure unclear. Further, the accompanying drawings are only for easily understanding the exemplary embodiment disclosed in this specification and the technical spirit disclosed by this specification is not limited by the accompanying drawings.

Although the terms "first", "second", and the like are used for describing various elements or components, these elements or components are not confined by these terms, of course. These terms are merely used for distinguishing one element or component from another element or component. Therefore, a first element or component to be mentioned below may be a second element or component in a technical spirit of the present disclosure.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B. or the case where X uses both A and B. Further, it should be understood that the term "and/or" used in this specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or it is not clear in terms of the context that a singular form is indicated, it should be construed that the singular form generally means "one or more" in this specification and the claims.

The terms "information" and "data" used in the specification may also be often used to be exchanged with each other.

It should be understood that, when it is described that a component is "connected to" or "accesses" another component, the component may be directly connected to or access the other component or a third component may be present therebetween. In contrast, it should be understood that, when it is described that a component is "directly connected to" or "directly access" another component, no component is present between the component and another component.

Suffixes "module" and "unit" for components used in the following description are given or mixed in consideration of easy preparation of the specification only and do not have their own distinguished meanings or roles.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or a usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

In the present disclosure, a server may perform registering on a plurality of images having a large size, such as a satellite image. In this case, when a size of each of the plurality of images is too large, it may be possible to input each of the plurality of images in a neural network based feature point extraction module as an input value. If the server inputs each of the plurality of images in the neural network based feature point extraction model without checking the size of the image as an input value, only a time and a resource may be wasted while a result value is not calculated. Accordingly, the server in the present disclosure may first determine whether to perform preprocessing on the plurality of images when the plurality of images is acquired. In addition, when the server determines that it is necessary to perform the preprocessing on the plurality of images, the server may perform the preprocessing on the plurality of images. Hereinafter, a method for image registration according to the present disclosure will be described through FIGS. 1 to 8.

FIG. 1 is a block diagram for describing an example of a server according to some exemplary embodiments of the present disclosure.

Referring to FIG. 1, a server 100 may include a processor 110, a storage unit 120, and a communication unit 130. However, components described above are not required in implementing the server 100 and the server 100 may thus have components more or less than components listed above.

The server 100 may include, for example, a predetermined type of computer system or computer device such as a microprocessor, a mainframe computer, a digital processor, a portable device, or a device controller. However, the present disclosure is not limited thereto.

Meanwhile, the processor 110 may generally process an overall operation of the server 100. The processor 110 processes a signal, data, information, and the like input or output through the components included in the server 100 or drives the application program stored in the storage unit 120 to provide or process information or a function appropriate for the user.

The processor 110 may be constituted by one or more cores and may include processors for data analysis, which include a central processing unit (CPU), a general purpose graphics processing unit (GPGPU), a tensor processing unit (TPU), and the like of the server 100.

In the present disclosure, the processor 110 may acquire a first image and a second image. As an example, the processor 110 may receive the first image and the second image from an external terminal through the communication unit 130. In addition, when acquiring the first image and the second image, the processor 110 may register the first image and the second image. Here, image registration may be used for displaying a plurality of images such as the first image and the second image at least partially different from the first image in one coordinate system. In this case, the processor 110 may determine whether to perform the processing on the first image and the second image.

Specifically, the processor 110 may extract a feature point of each of the first image and the second image in order to register the first image and the second image. Here, the feature point as a part which becomes a feature in the image may be for the processor 110 to find a common part in the first image and the second image. However, when the sizes of the first and second images are excessively larger than the performance of the processor 110 or the server 100, the processor 110 may not extract the feature points of the first and second images. As an example, there may be excessively many feature points in the first and second images such as the satellite image. In this case, a lot of time may be consumed for the processor 110 to extract the feature point or it may be impossible for the processor 110 to extract the feature point. Accordingly, the processor 110 may determine whether to perform the preprocessing based on the number of pixels of each of the first and second images before registering the first and second images. Hereinafter, an example of a method for performing, by the processor 110 according to the present disclosure, the preprocessing on the first and second images will be described through FIGS. 1 to 6.

Meanwhile, the storage unit 120 may include a memory and/or a persistent storage. The memory may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the present disclosure, the storage unit 120 may store any type of information generated or determined by the processor 110 or any type of information received by the communication unit 130.

For example, the storage unit 120 may store a plurality of images acquired through the communication unit 130.

Meanwhile, the communication unit 130 may include one or more modules which enable communication between the server 100 and the communication system and between the server 100 and a network (not illustrated).

In the present disclosure, the communication unit 130 may receive the plurality of images from an external terminal. For example, the communication unit 130 may receive ground photographing images from a satellite system, an aircraft system, etc. Further, the ground photographing images may be mutually paired images or images which are not paired. The ground photographing images may include all of an electro-optic image, a synthetic aperture radar (SAR) image, and the like photographed through an artificial satellite, an aircraft, etc. The ground photographing images are not limited to the above-described example, but may be variously configured within a range to be understood by those skilled in the art.

Figure 2:
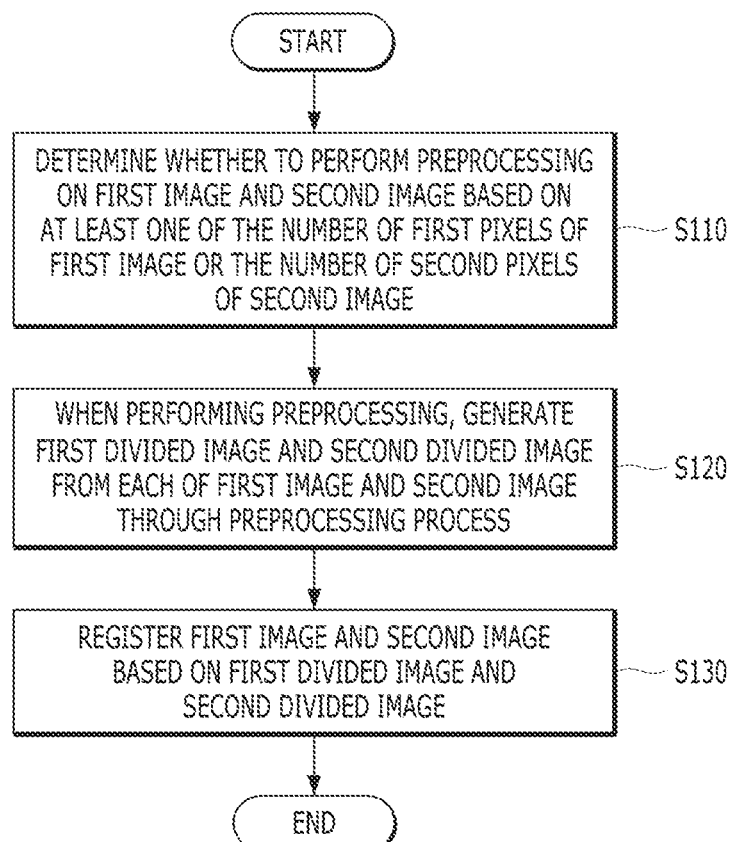
FIG. 2 is a flowchart for describing an example of a method for registering, by a server, an image according to some exemplary embodiments of the present disclosure.

FIG. 2 is a flowchart for describing an example of a method for registering, by a server, an image according to some exemplary embodiments of the present disclosure. Referring to FIG. 2, a processor 110 of a server 100 may determine whether to perform preprocessing based on at least one of the number of first pixels of a first image or the number of second pixels of a second image (S110).

Specifically, the processor 110 may recognize the number of first pixels of the first image and the number of second pixels of the second image. In addition, when at least one of the number of first pixels or the number of second pixels is equal to or more than a preset value, the processor 110 may determine to perform the preprocessing. Here, the preset value may be prestored in a storage unit 120.

Meanwhile, when the number of first pixels or the number of second pixels is less than a preset value, the processor 110 may determine not to perform the preprocessing. In this case, the processor 110 may immediately register the first image and the second image.

Specifically, in the case of not the satellite image but a general image, even though image registration is performed without checking whether to perform the preprocessing, the image registration may be performed while problems described above do not occur. Alternatively, some satellite images may have a size in which a problem does not occur when the processor 110 extracts the feature point. However, when the preprocessing is performed even on the images, resources which may be utilized by the processor 110 may be wasted. Accordingly, when the number of first pixels of the first image and the number of second pixels of the second image are less than a preset value, the processor 110 determines not to perform the preprocessing to reduce the waste of the resources.

Meanwhile, when the processor 110 of the server 100 performs the preprocessing, the processor 110 may generate a first divided image and a second divided image from each of the first image and the second image through the preprocessing process (S120).

Specifically, the processor 110 may generate a first divided image acquired by dividing at least a partial area of the first image so as to extract the feature point from each of the first image and the second image. In addition, the processor 110 may generate a second divided image acquired by dividing at least a partial area of the second image.

Meanwhile, according to some exemplary embodiments of the present disclosure, the processor 110 of the server 100 may generate a first sub image acquired by reducing the first image in order to generate the first divided image. Further, the processor 110 may generate a second sub image acquired by reducing the second image in order to generate the second divided image.

Specifically, when the processor 110 generates the first divided image and the second divided image by using a random area in each of the first image and the second image, there may not be feature points corresponding to the first divided image and the second divided image. In this case, the processor 110 may recognize the first image and the second image as different images. Accordingly, the processor 110 may generate the first sub image by reducing the first image to a preset size and generate the second sub image by reducing the second image to a preset size. In addition, the processor 110 may generate the first divided image and the second divided image based on feature points extracted from the first sub image and the second sub image. Hereinafter, a preprocessing operation according to the present disclosure will be described through FIGS. 3 to 5.

Meanwhile, the processor 110 of the server 100 may register the first image and the second image based on the first divided image and the second divided image (S130).

Specifically, the processor 110 may determine at least one matching point matched by comparing at least one feature point extracted from the first divided image and at least one feature point extracted from the second divided image. In addition, the processor 110 may change the second image based on a coordinate derived from at least one matching point. As an example of the change of the image, warping may be considered. Here, the warping may be rotating the image by moving a location of the pixel of the second image so that the second image may be registered to the first image. In addition, the processor 110 may register the second image which is changed (for example, warped) to the first image. Hereinafter, an example of the method for registering, by the processor 110 the first image and the second image based on the first divided image and the second divided image according to the present disclosure will be described in more detail through FIG. 6.

Meanwhile, according to some exemplary embodiments of the present disclosure, the second image may be a satellite image generated after the first image is generated.

As an example the second image may be an image photographed at a later time than the first image. As another example, the first image may be a prestored satellite image and the second image may be a newly acquired satellite image. Accordingly, when the processor 110 of the server 100 registers the first image and the second image, the processor 110 may register the first image and the second image. However, the present disclosure is not limited thereto.

Meanwhile, according to some exemplary embodiments of the present disclosure, the processor 110 of the server 100 may generate the first divided image from the first image and generate the second divided image from the second image through the preprocessing process. Hereinafter, the preprocessing process according to the present disclosure will be described.

Figure 3:
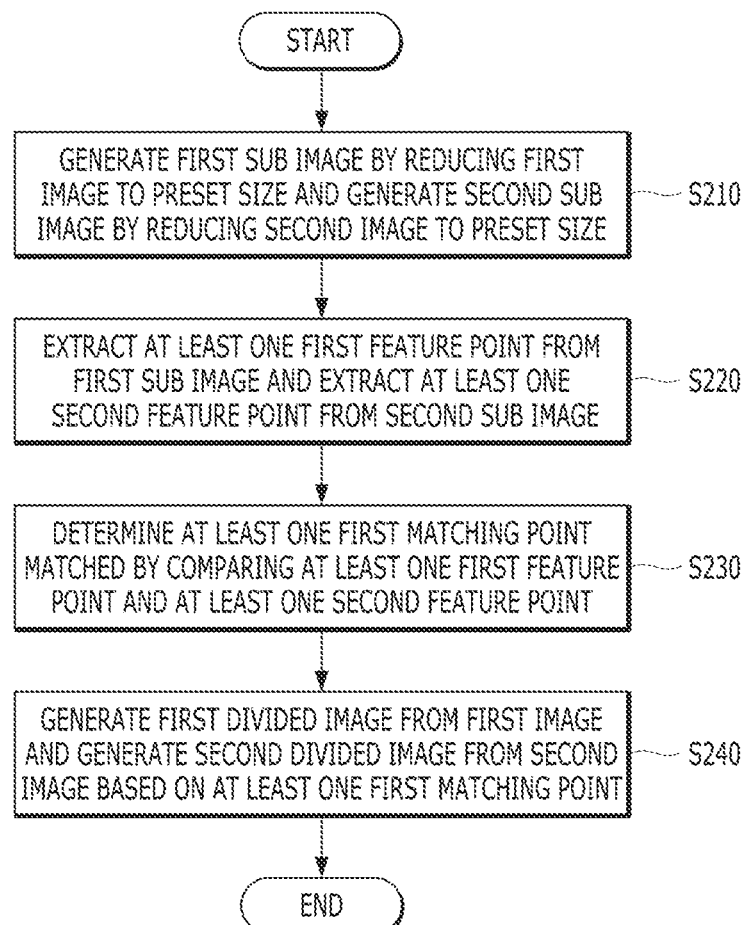
FIG. 3 is a flowchart for describing an example of a preprocessing process according to some exemplary embodiments of the present disclosure.

FIG. 3 is a flowchart for describing an example of a preprocessing process according to some exemplary embodiments of the present disclosure.

Referring to FIG. 3, the processor 110 of the server 100 may generate the first sub image by reducing the first image to a preset size and generate the second sub image by reducing the second image to a preset size (S210). Here, the preset size may be prestored in the storage unit 120.

As an example, the preset size may be a size which may be inputted into a neural network based feature point extraction model. Here, the neural network based feature point extraction model may be a model learned by using a ground photographing image including contents such as forest, urban, etc., as learning data. Hereinafter, an example of the neural network based feature point extraction model according to the present disclosure will be described through FIG. 7.

Meanwhile, according to some exemplary embodiments of the present disclosure, the processor 110 of the server 100 may reduce the first image and the second image based on a preset ratio.

Meanwhile, the processor 110 of the server 100 may extract at least one first feature point from the first sub image and extract at least one second feature point from the second sub image (S220).

Specifically, the processor 110 inputs, as an input value, the first sub image into the neural network based feature point extraction model to extract at least one first feature point. In addition, the processor 110 inputs, as the input value, the second sub image into the neural network based feature point extraction model to extract at least one second feature point.

Meanwhile, the processor 110 of the server 100 may determine at least one first matching point matched by comparing at least one first feature point and at least one second feature point (S230).

As an example, the processor 110 may determine at least one first matching point by using a matching algorithm such as Brute-Force (BF) matcher, Multi-modal Image Matching Based on Radiation-invariant Feature Transform (RIFT), or Fast Library for Approximate Nearest Neighbors (FLANN). However, the present disclosure is not limited thereto.

Meanwhile, according to some exemplary embodiments of the present disclosure, the processor 110 of the server 100 may generate the first divided image from the first image and generate the second divided image from the second image based on at least one first matching point (S240).

Specifically, the processor 110 may determine area information on an area in which at least one first matching point is disposed in the first sub image. As an example, the processor 110 may recognize a coordinate point in which at least one first matching point is disposed in the first sub image. In addition, the processor 110 may determine area information for a preset area that is centered on the coordinate point. In this case, the processor 110 may generate the first divided image including the area in which at least one first matching point is disposed from the first image by using the area information. Further, the processor 110 may determine the area information on the area in which at least one first matching point is disposed in the second sub image. As an example, the processor 110 may recognize the coordinate point in which at least one first matching point is disposed in the second sub image. In addition, the processor 110 may determine the area information for the preset area that is centered on the coordinate point. In this case, the processor 110 may generate the second divided image including the area in which at least one first matching point is disposed from the second image by using the area information.

Meanwhile, according to some exemplary embodiments of the present disclosure, the processor 110 of the server 100 may determine the size of the first divided image. As an example, the processor 110 may determine the size of the first divided image based on the area information on the area in which at least one first matching point is disposed in the first sub image. In addition, the processor 2 may determine the size of the first divided image based on the area information on the area in which at least one first matching point is disposed in the second sub image.

Meanwhile, according to some exemplary embodiments of the present disclosure, the sizes of the first image and the second image may be different. In this case, the sizes of the first divided image and the second divided image generated based on the area information of each of the first sub image and the second sub image may be different. However, in the neural network based feature point extraction model, when the sizes of the first divided image and the second divided image are different, the sizes of the first and second divided images may not be used as the input values. In order to prevent this, the processor 110 may determine the size of the first divided image based on the area information on the area in which at least one first matching point is disposed in the first sub image. In addition, the processor 110 may generate the second divided image to correspond to the size of the first divided image based on the determined size of the first divided image. Accordingly, the processor 110 may generate the first divided image and the second divided image with the same size.

Meanwhile, according to some exemplary embodiments of the present disclosure, when at least one first matching point is determined, the processor 110 of the server 100 may remove remaining feature points other than at least one first matching point from each of the first sub image and the second sub image. In addition, the processor 110 may generate the first divided image from the first image and the second divided image from the second image based on the first sub image and the second sub image from which the remaining feature points are removed.

Specifically, there may be excessively many feature points which become features in the satellite images such as the first sub image and the second sub image. However, feature points which are not matched may be unnecessary information in determining the area information based on the matching point by the processor 110. Further, the excessively many feature points may cause degradation of performance when the processor 110 performs a calculation. Accordingly, when at least one first matching point is determined, the processor 110 may remove the remaining feature points other than at least one first matching point from each of the first sub image and the second sub image.

According to the above-described configuration, the processor 110 may generate the first sub image by reducing the first image and generate the second sub image by reducing the second image. In addition, the processor 110 may extract the feature points from the first sub image and the second sub image. In this case, even though the processor 110 receives a large-sized image, the processor 110 may extract at least one feature which is present in the first image and the second image at a high speed.

Meanwhile, according to some exemplary embodiments of the present disclosure, the processor 110 of the server 100 may generate at least one cluster by performing clustering on at least one first matching point. In addition, the processor 110 may generate a divided image based on at least one cluster. Hereinafter, a method in which the processor 110 according to the present disclosure generates the divided image based on at least one cluster will be described.

Figure 4:
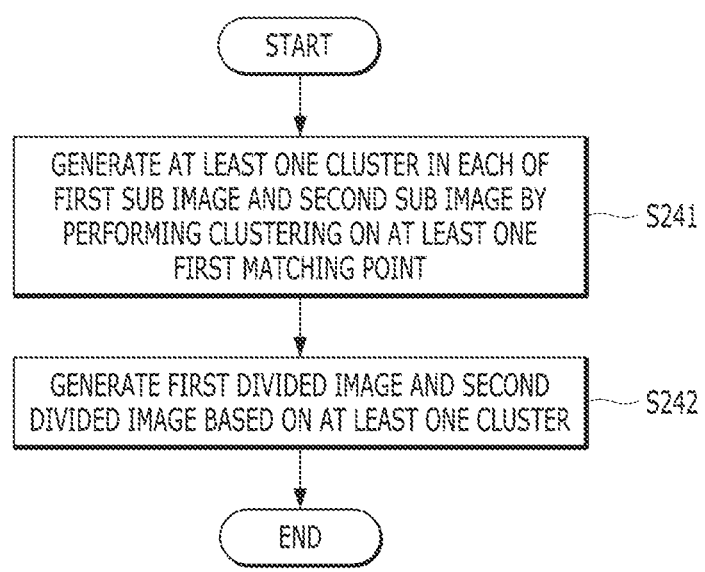
FIG. 4 is a flowchart for describing an example of a method for generating, by a server, a divided image based on at least one cluster according to some exemplary embodiments of the present disclosure.

FIG. 4 is a flowchart for describing an example of a method for generating, by a server, a divided image based on at least one cluster according to some exemplary embodiments of the present disclosure.

Referring to FIG. 4, the processor 110 of the server 100 may generate at least one cluster on each of the first sub image and the second sub image by performing clustering on at least one first matching point (S241). Here, the clustering may be classifying or generating each of at least one first matching point to several clusters (or groups) based on a distance, a range, or a density.

Meanwhile, according to some exemplary embodiments of the present disclosure, the processor 110 of the server 100 may generate at least one cluster in each of the first sub image and the second sub image based on the density of at least one first matching point. As an example, the processor 110 may generate at least one cluster in each of the first sub image and the second sub image according to a density-based clustering (density-based spatial clustering of applications with noise (DBSCAN). Here, the density may be a value for a degree in which at least one first matching point is finely concentrated.

Specifically, the processor 110 may determine the density of at least one first matching point based on the degree in which at least one first matching point is concentrated. In addition, when the density of at least one first matching point is equal to or more than a preset value, the processor 110 may generate at least one cluster by performing the clustering on the at least one first matching point.

For example, the processor 110 may recognize one matching point among at least one first matching point when at least one first matching point is recognized. In addition, the processor 110 may recognize the number of at least one matching point within one area from the one matching point. In addition, when the number of at least one matching point present in one area is equal to or more than a preset number, the processor 110 may perform the clustering on at least one matching point which is present in one area. However, the present disclosure is not limited thereto.

Meanwhile, according to some exemplary embodiments of the present disclosure, the processor 110 of the server 100 may generate at least one cluster in each of the first sub image and the second sub image based on the density of at least one first matching point. As an example, the processor 110 may generate at least one cluster in each of the first sub image and the second sub image according to a density-based clustering (density-based spatial clustering of applications with noise (DBSCAN). Here, the density may be a value for a degree in which at least one first matching point is finely concentrated.

Meanwhile, according to some exemplary embodiments of the present disclosure, the processor 110 of the server 100 may generate at least one cluster in each of the first sub image and the second sub image according to a K-means clustering technique that may form a cluster constituted by at least one first matching point. Here. K-means clustering may be a technique for generating the cluster based on a distance between at least one first matching point.

As an example, the processor 110 may determine to generate K clusters. In this case, the processor 110 may determine a random center point of each of K clusters in each of the first sub image and the sub second image. Further, the processor 110 may recognize a distance between the random center point of each of K clusters and at least one first matching point. In addition, the processor 110 may move a random center point based on the distance between the random center point of each of K clusters and at least one first matching point. In addition, the processor 110 may determine the cluster constituted by at least one first matching point based on the moved random center point. However, the present disclosure is not limited thereto.

Meanwhile, in the present disclosure, the processor 110 of the server 100 may generate only at least one cluster including five or more first matching points in generating at least one cluster based on the density-based spatial clustering of applications with noise (DBSCAN) or the K-means clustering.

Meanwhile, in the present disclosure, the processor 110 of the server 100 may use mean-shift clustering, Gaussian mixture model (GMM), etc., in addition to the density-based spatial clustering of applications with noise (DBSCAN) or the K-means clustering.

Meanwhile, when at least one cluster is generated, the processor 110 of the server 100 may generate the first divided image and the second divided image based on at least one cluster (S242).

Specifically, the processor 110 may determine area information on an area in which at least one cluster is disposed in the first sub image. In addition, when the area information is determined, the processor 110 may determine the area in which at least one cluster is disposed in the first image by using the area information. In this case, the processor 110 may generate the first divided image including the area in which at least one cluster is disposed in the first image. Further, the processor 110 may determine area information on an area in which at least one cluster is disposed in the second sub image. In addition, when the area information is determined, the processor 110 may determine the area in which at least one cluster is disposed in the second image by using the area information. In this case, the processor 110 may generate the second divided image including the area in which at least one cluster is disposed in the second image.

Meanwhile, according to some exemplary embodiments of the present disclosure, when at least one cluster is generated, the processor 110 of the server 100 may determine a shortage cluster in which the number of at least one first matching point is less than a preset number among at least one cluster. In addition, the processor 110 may remove the shortage cluster in which the number of at least one first matching point is less than the preset number from each of the first sub image and the second sub image.

Specifically, when at least one cluster is generated, the processor 110 may recognize the number of at least one first matching point included in each of at least one cluster. In addition, the processor 110 may determine at least one cluster in which the number of at least one first matching point is less than a preset number as the shortage cluster. In this case, the processor 110 may remove the shortage cluster from the first sub image and remove the shortage cluster from the second sub image.

As an example, the processor 110 may determine a cluster in which the number of at least one first matching point is less than 5 as the shortage cluster. However, the present disclosure is not limited thereto.

When the first sub image and the second sub image from which the shortage cluster is removed are generated, the processor 110 may generate the first divided image and the second divided image based on at least one cluster.

Specifically, the processor 110 may determine third area information on an area in which at least one cluster is disposed in the first sub image from which the shortage cluster is removed. Here, the third area information may include information on a third coordinate point corresponding to the center of each of the at least one cluster and information on a size in which each of the at least one cluster is disposed in the first sub image from which the shortage cluster is removed. In addition, when the third area information is determined, the processor 110 may determine a third point corresponding to the third coordinate point in the first image based on the third coordinate point included in the third area information. Further, the processor 110 may determine the size of the first divided image based on information on a size in which each of at least one cluster included in the third area information is disposed. As an example, the size of the first divided image may be determined as a size including all of at least one cluster.

The processor 110 may determine fourth area information on an area in which at least one cluster is disposed in the second sub image from which the shortage cluster is removed. Here, the fourth area information may include information on a fourth coordinate point corresponding to the center of each of the at least one cluster and information on a size in which each of the at least one cluster is disposed in the second sub image from which the shortage cluster is removed. In addition, when the fourth area information is determined, the processor 110 may determine a fourth point corresponding to the fourth coordinate point in the second image based on the fourth coordinate point included in the fourth area information. Further, the processor 110 may determine the size of the second divided image based on information on a size in which each of at least one cluster included in the fourth area information is disposed. As an example, the size of the second divided image may be determined as the size including all of at least one cluster.

According to the above-described configuration, the processor 110 may generate the first divided image and the second divided image based on at least one cluster. In this case, at least one cluster may be a cluster generated based on the density or distance of at least one matching point. Therefore, an incorrect divided image may be prevented from being used in extracting at least one feature point based on the first divided image and the second divided image generated by the processor 110.

Meanwhile, according to some exemplary embodiments of the present disclosure, the processor 110 of the server 100 may generate a divided image by using a major cluster having the highest density among at least one cluster. Hereinafter, a method in which the processor 110 generates the divided image by using the major cluster according to the present disclosure will be described.

Figure 5:
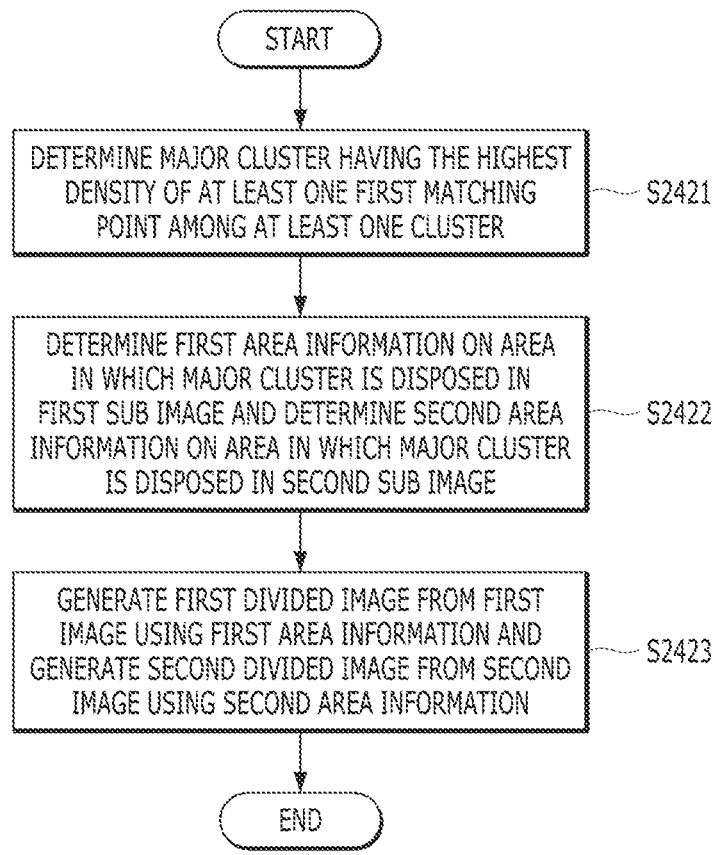
FIG. 5 is a flowchart for describing an example of a method for generating, by a server, a divided image by using a major cluster according to some exemplary embodiments of the present disclosure.

FIG. 5 is a flowchart for describing an example of a method for generating, by a server, a divided image by using a major cluster according to some exemplary embodiments of the present disclosure.

Referring to FIG. 5, the processor 110 of the server 100 may determine the major cluster having the highest density of at least one first matching point among at least one cluster (S2421).

Meanwhile, when the major cluster is determined, the processor 110 of the server 100 may determine first area information for an area in which the major cluster is disposed in the first sub image and determine second area information for an area in which the major cluster is disposed in the second sub image (S2422).

Specifically, when the major cluster is determined, the processor 110 may recognize a first coordinate point corresponding to the center of the major cluster in the first sub image. In addition, the processor 110 may recognize a size in which the major cluster is disposed in the first sub image. In this case, the processor 110 may determine first area information including a first coordinate point, and information on the size in which the major cluster is disposed. Further, when the major cluster is determined, the processor 110 may recognize a second coordinate point corresponding to the center of the major cluster in the second sub image. In addition, the processor 110 may recognize a size in which the major cluster is disposed in the second sub image. In this case, the processor 110 may determine second area information including a second coordinate point, and information on the size in which the major cluster is disposed.

Meanwhile, the processor 110 of the server 100 may generate the first divided image from the first image using the first area information and generate the second divided image from the second image using the second area information (S2423).

Specifically, the processor 110 may determine the first point corresponding to the first coordinate point in the first image based on the first coordinate point included in the first area information. Further, the processor 110 may determine the size of the first divided image based on information on a size in which the major cluster is disposed, which is included in the first area information. As an example, the size of the first divided image may be equal to the size in which the major cluster is disposed. As another example, the size of the first divided image may be larger than the size in which the major cluster is disposed so as to include the major cluster. In addition, the processor 110 may generate the first divided image based on the first point and the determined size of the first divided image. Further, the processor 110 may determine the second point corresponding to the second coordinate point in the second image based on the second coordinate point included in the second area information. Further, the processor 110 may determine the size of the second divided image based on information on a size in which the major cluster is disposed, which is included in the second area information. As an example, the size of the second divided image may be equal to the size in which the major cluster is disposed. As another example, the size of the second divided image may be larger than the size in which the major cluster is disposed so as to include the major cluster. In addition, the processor 110 may generate the second divided image based on the second point and the determined size of the second divided image. However, the present disclosure is not limited thereto.

Meanwhile, according to some exemplary embodiments of the present disclosure, the sizes of the first image and the second image may be different. In this case, the size of the first divided image generated based on the first area information in the first sub image and the size of the second divided image generated based on the second area information in the second sub image may be different. However, in the neural network based feature point extraction model, when the sizes of the first divided image and the second divided image are different, the sizes of the first and second divided images may not be used as the input values. In order to prevent this, the processor 110 may determine the size of the first divided image based on the first area information on the area in which the major cluster is disposed is disposed in the first sub image. In addition, the processor 110 may generate the second divided image to correspond to the size of the first divided image based on the determined size of the first divided image. However, the present disclosure is not limited thereto.

Meanwhile, according to some exemplary embodiments of the present disclosure, when the major cluster is determined, the processor 110 of the server 100 may remove the remaining clusters other than the major cluster from each of the first sub image and the second sub image. In addition, the processor 110 may generate the first divided image from the first image and the second divided image from the second image based on the first sub image and the second sub image from which the remaining cluster is removed.

Meanwhile, according to some exemplary embodiments of the present disclosure, the processor 110 of the server 100 may generate only a preset number of clusters in generating at least one cluster.

Specifically, the processor 110 may generate only several clusters having a high density of at least one first matching point when performing clustering on at least one first matching point.

According to the above-described configuration, the processor 110 of the server 100 may generate the first divided image and the second divided image based on the major cluster. In this case, the major cluster may be a cluster having the highest density of at least one first matching point which is simultaneously present in the first sub image and the second sub image. Therefore, the processor 110 may be prevented from generating the first divided image and the second divided image by using areas which do not correspond to each other in the first image and the second image. That is, accuracy may be enhanced in an operation of the processor 110 which generates the first divided image and the second divided image.

Meanwhile, according to some exemplary embodiments of the present disclosure, the processor 110 of the server 100 may register the first image and the second image based on the generated first and second divided images. Hereinafter, a method in which the processor 110 registers the first image and the second image according to the present disclosure will be described.

Figure 6:
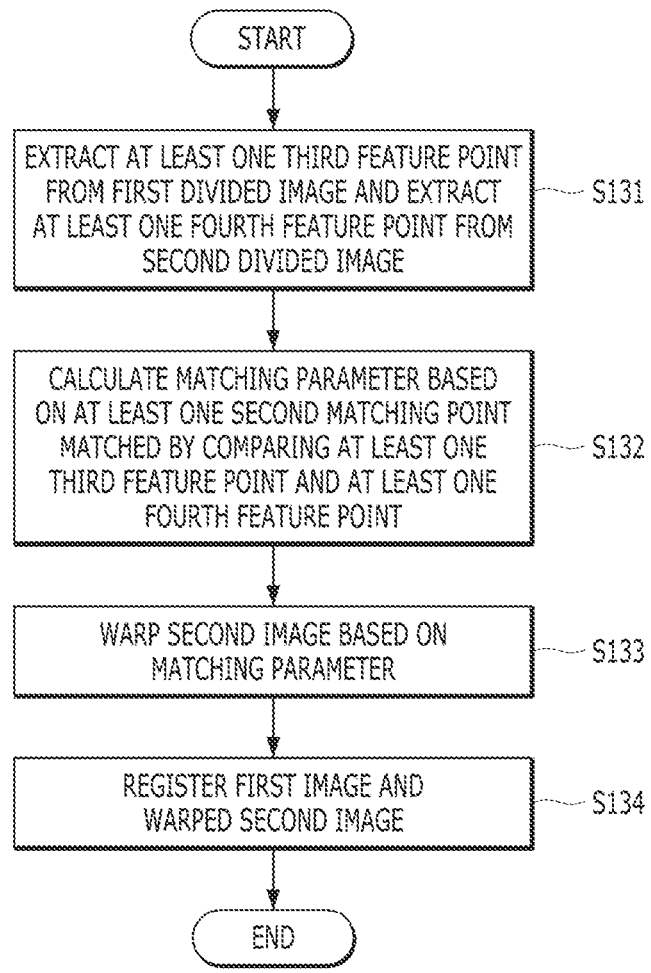
FIG. 6 is a flowchart for describing an example of a method for registering, by a server, a first image and a second image based on a first divided image and a second divided image according to some exemplary embodiments of the present disclosure.

FIG. 6 is a flowchart for describing an example of a method for registering, by a server, a first image and a second image based on a first divided image and a second divided image according to some exemplary embodiments of the present disclosure.

Referring to FIG. 6, the processor 110 of the server 100 may extract at least one third feature point from the first divided image and extract at least one fourth feature point from the second divided image (S131).

Specifically, the processor 110 inputs, as an input value, the first divided image into the neural network based feature point extraction model to extract at least one third feature point. In addition, the processor 110 inputs, as the input value, the second image into the neural network based feature point extraction model to extract at least one fourth feature point. However, the present disclosure is not limited thereto.

Meanwhile, according to some exemplary embodiments of the present disclosure, it may be impossible to input the first divided image and the second divided image into the neural network based feature point extraction model.

Specifically, in the case of an image having a super resolution, even though a divided image is generated from an original image, it may still be difficult to use the divided image as the input value into the neural network based feature point extraction model. Further, the server may generate a sub image acquired by significantly reducing the original image by assuming only the image having the super resolution and an incorrect divided image may be generated when the feature point is extracted from the sub image. As an example, only divided images in which an incorrect matching point is determined may also be generated. Accordingly, the processor 110 of the server 100 according to the present disclosure may generate the divided image based on a sub image acquired by reducing the original image to a preset size. In addition, when it is still impossible to input the divided image into the neural network based feature point extraction model, the processor 110 may repeatedly perform the above-described preprocessing process by using the divided image.

Specifically, when it is impossible to input each of the first divided image and the second divided image into the neural network based feature point extraction model, the processor 110 may generate the third sub image by reducing the first divided image to a preset size. Further, the processor 110 may generate the fourth sub image by reducing the second divided image to a preset size. In addition, the processor 110 may generate the third divided image and the fourth divided image based on the first sub image and the second sub image. In this case, the processor 110 may register the first image and the second image based on the third divided image and the fourth divided image. However, the present disclosure is not limited thereto.

Meanwhile, the processor 110 of the server 100 may calculate a matching parameter based on at least one second matching point matched by comparing at least one third feature point and at least one fourth feature point (S132). Here, the matching parameter may include a value for converting a coordinate system of at least one second matching point on the first divided image into a coordinate system of at least one second matching point to be present on the first image. Further, the matching parameter may include a value for converting a coordinate system of at least one second matching point on the second divided image into a coordinate system of at least one second matching point to be present on the second image.

As an example, the processor 110 may calculate the matching parameter by using an algorithm such as RANdom SAmple Consensus (RANSAC). Automatic Registration of Remote-Sensing Images (ARRSI), or Multi-modal Image Matching Based on Radiation-invariant Feature Transform (RIFT). However, the present disclosure is not limited thereto.

Meanwhile, the processor 110 of the server 100 may warp a second image based on the calculated matching parameter (S133). Here, the warping may be varying a form by shifting the location of the pixel of the second image so as to register the second image to the first image.

Meanwhile, according to some exemplary embodiments of the present disclosure, the second image may be an image generated after the first image is generated. Further, the first image may be an image which is matched to another image in advance. As a result, the processor 110 may warp the second image and register the warped second image to the first image. However, the present disclosure is not limited thereto, but when the second image becomes a reference image, the processor 110 may warp the first image.

Meanwhile, when the second image is warped, the processor 110 of the server 100 may register the first image and the warped second image (S134).

As described through FIGS. 1 to 6, the processor 110 of the server 100 according to the present disclosure may determine whether to perform preprocessing based on the number of pixels of the image. If the processor intends to extract the feature point by generating the divided image without determining whether to perform the preprocessing in the image such as the satellite image, it may be impossible to extract the feature point according to the size of the image. Further, in this case, there may also be a problem in that a resource and time for extracting the feature point are already assumed, but a result value may not be acquired. Conversely, when the preprocessing is performed on an image which need not be preprocessed, unnecessary resources may be wasted. Accordingly, the processor 110 according to the present disclosure may determine whether to perform the preprocessing based on the number of pixels of the image.

When the processor 110 performs the preprocessing, the processor 110 may generate the first sub image and the second sub image acquired by reducing the first image and the second image. In addition, the processor 110 may determine the major cluster matched with each other in the first sub image and the second sub image, and generate the first divided image and the second divided image based on the major cluster. Therefore, the processor 110 may be prevented from generating the first divided image and the second divided image may be prevented by using areas which do not correspond to each other in the first image and the second image.

Figure 7:
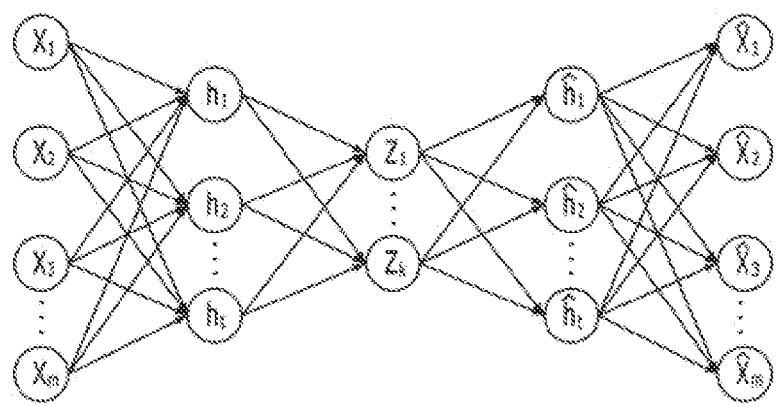
FIG. 7 is a schematic view illustrating a network function according to some exemplary embodiments of the present disclosure.

FIG. 7 is a schematic view illustrating a network function according to some exemplary embodiments of the present disclosure.

Throughout the present specification, a model, a neural network, a network function, and a neural network may be used as the same meaning. The neural network may be generally constituted by an aggregate of calculation units which are mutually connected to each other, which may be called "node".

The "nodes" may also be called "neurons". The neural network is configured to include one or more nodes. The nodes (alternatively, neurons) constituting the neural networks may be connected to each other by one or more "links".

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa. In the relationship of the input node and the output node connected through one link, a value of the output node may be determined based on data input in the input node. Here, a node connecting the input node and the output node to each other may have a weight.

The weight may be variable and the weight is variable by a user or an algorithm in order for the neural network to perform a desired function.

For example, when one or more input nodes are mutually connected to one output node by the respective links, the output node may determine an output node value based on values input in the input nodes connected with the output node and the weights set in the links corresponding to the respective input nodes. As described above, in the neural network, one or more nodes are connected to each other through one or more links to form a relationship of the input node and output node in the neural network.

A characteristic of the neural network may be determined according to the number of nodes, the number of links, correlations between the nodes and the links, and values of the weights granted to the respective links in the neural network.

For example, when the same number of nodes and links exist and there are two neural networks in which the weight values of the links are different from each other, it may be recognized that two neural networks are different from each other. The neural network may be configured to include one or more nodes. Some of the nodes constituting the neural network may constitute one layer based on the distances from the initial input node.

For example, a set of nodes of which distance from the initial input node is n may constitute n layers. The distance from the initial input node may be defined by the minimum number of links which should be passed through for reaching the corresponding node from the initial input node.

However, definition of the layer is predetermined for description and the order of the layer in the neural network may be defined by a method different from the aforementioned method.

For example, the layers of the nodes may be defined by the distance from a final output node. The initial input node may mean one or more nodes in which data is directly input without passing through the links in the relationships with other nodes among the nodes in the neural network.

Alternatively, in the neural network, in the relationship between the nodes based on the link, the initial input node may mean nodes which do not have other input nodes connected through the links.

Similarly thereto, the final output node may mean one or more nodes which do not have the output node in the relationship with other nodes among the nodes in the neural network.

A hidden node may mean not the initial input node and the final output node but the nodes constituting the neural network.

In the neural network according to some exemplary embodiments of the present disclosure, the number of nodes of the input layer may be the same as the number of nodes of the output layer, and the neural network may be a neural network of a type in which the number of nodes decreases and then, increases again from the input layer to the hidden layer.

In the neural network according to another exemplary embodiment of the present disclosure, the number of nodes of the input layer may be smaller than the number of nodes of the output layer, and the neural network may be a neural network of a type in which the number of nodes decreases from the input layer to the hidden layer.

In the neural network according to other some exemplary embodiments of the present disclosure, the number of nodes of the input layer may be larger than the number of nodes of the output layer, and the neural network may be a neural network of a type in which the number of nodes increases from the input layer to the hidden layer.

The neural network according to yet other some exemplary embodiments of the present disclosure may be a neural network of a type in which the neural networks are combined.

A deep neural network (DNN) may refer to a neural network that includes a plurality of hidden layers in addition to the input and output layers.

When the deep neural network is used, the latent structures of data may be determined. That is, potential structures of photos, text, video, voice, and music (e.g., what objects are in the picture, what the content and feelings of the text are, what the content and feelings of the voice are) may be determined.

The deep neural network may include a convolutional neural network, a recurrent neural network (RNN), an auto encoder, generative adversarial networks (GAN), a restricted Boltzmann machine (RBM), a deep belief network (DBN), a Q network, a U network, a Siam network, and the like.

The description of the deep neural network described above is just an example and the present disclosure is not limited thereto. The neural network may be learned in at least one scheme of supervised learning, unsupervised learning, and semi supervised learning.

Learning of the neural network is to minimize errors in output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network.

In the case of the supervised learning, the learning data labeled with a correct answer is used for each learning data (i.e., the labeled learning data) and in the case of the unsupervised learning, the correct answer may not be labeled in each learning data.

That is, for example, the learning data in the case of the supervised learning related to the data classification may be data in which category is labeled in each learning data. The labeled learning data is input to the neural network, and the error may be calculated by comparing the output (category) of the neural network with the label of the learning data.

As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch).

The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy. In learning of the neural network, the learning data may be generally a subset of actual data (i.e., data to be processed using the learned neural network) of actual data, and as a result, there may be a learning cycle in which errors for the learning data decrease, but the errors for the actual data increase.

Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, etc., may be applied.

Figure 8:
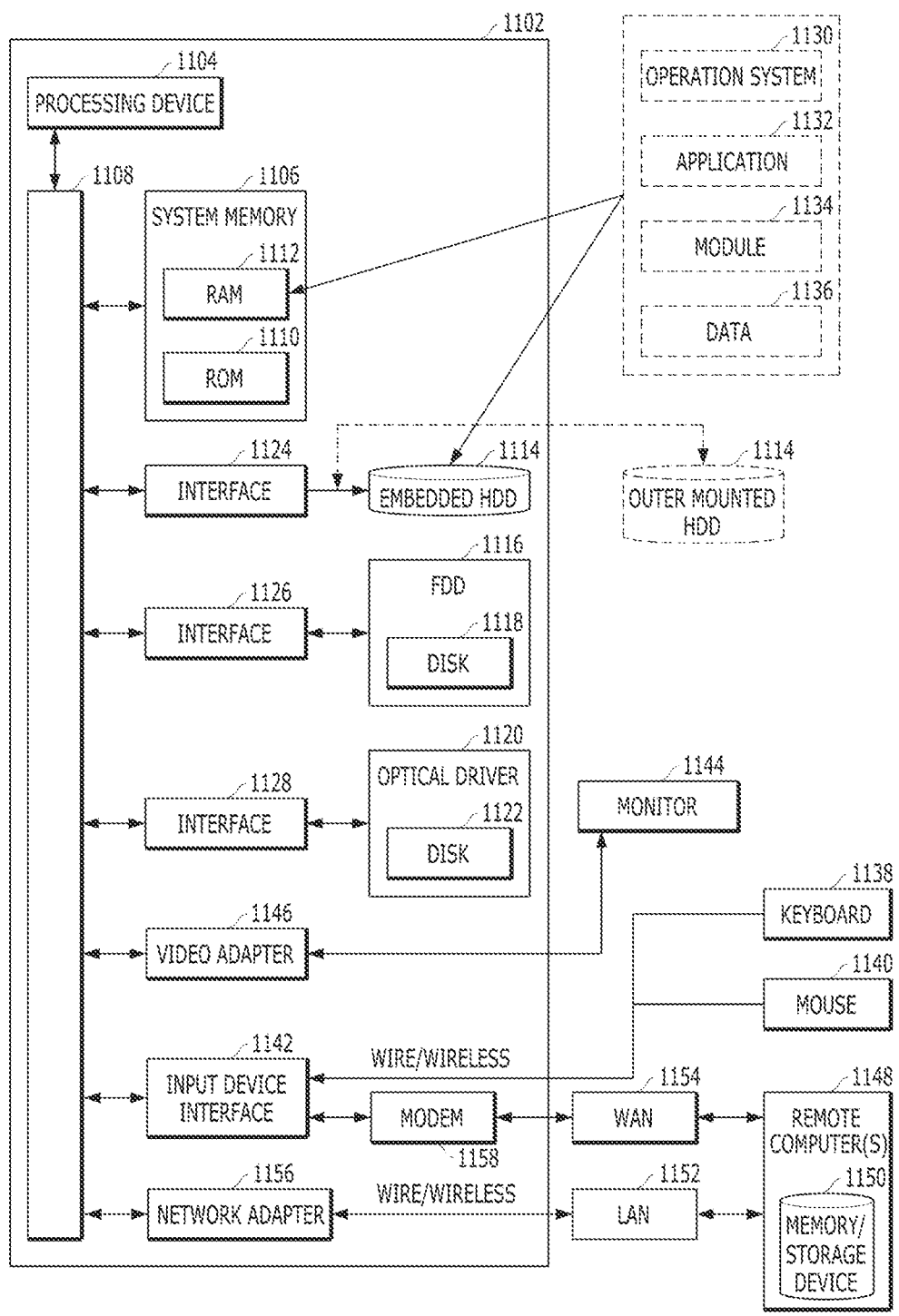
FIG. 8 is a general schematic view of an exemplary computing environment in which exemplary embodiments of the present disclosure may be implemented.

FIG. 8 is a general schematic view of an exemplary computing environment in which exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. The computer includes, as a computer accessible medium, volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, temporary and non-temporary media, and movable and non-movable media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable instructions for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, an apparatus, or a standard programming and/or engineering technique. The term "manufactured article" includes computer programs or media which are accessible by a predetermined computer-readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" includes a wireless channel and various other media that can store, possess, and/or transfer instruction(s) and/or data, but is not limited thereto.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be interpreted within the widest range which is coherent with the principles and new features presented herein.

What is claimed is:

1. A method for image registration performed by a computing device including at least one processor comprising:
   determining whether to perform preprocessing on a first image and a second image, based on at least one of the number of first pixels of the first image or the number of second pixels of the second image;

when performing the preprocessing, generating a first divided image and a second divided image from each of the first image and the second image through a preprocessing process; and registering the first image and the second image, based on the first divided image and the second divided image, wherein the preprocessing process comprises:

generating a first sub image by reducing the first image to a preset size, and generating a second sub image by reducing the second image to a preset size;

extracting at least one first feature point from the first sub image, and extracting at least one second feature point from the second sub image;

determining at least one first matching point matched by comparing the at least one first feature point and the at least one second feature point;

generating the first divided image from the first image and generating the second divided image from the second image, based on the at least one first matching point; and when the at least one first matching point is determined, removing remaining feature points other than the at least one first matching point from each of the first sub image and the second sub image;

and, wherein the generating the first divided image from the first image and generating the second divided image from the second image, based on the at least one first matching point comprises:

generating the first divided image from the first image based on the first sub image from which the remaining feature points have been removed, and generating the second divided image from the second image based on the second sub image from which the remaining feature points have been removed.

2. The method for image registration of claim 1, wherein the determining whether to perform preprocessing comprises:

when at least one of the number of the first pixels or the number of the second pixels is equal to or greater than a preset value, determining to perform the preprocessing.

3. The method for image registration of claim 1, wherein the determining whether to perform preprocessing comprises:

when the number of the first pixels and the number of the second pixels are less than a preset value, registering the first image and the second image without performing the preprocessing.

4. The method for image registration of claim 1, wherein the first image is a satellite image, and the second image is a satellite image generated after the first image is generated.

5. The method for image registration of claim 1, wherein the generating the first divided image from the first image and generating the second divided image from the second image, based on the at least one first matching point comprises:

generating at least one cluster in each of the first sub image and the second sub image by performing clustering on the at least one first matching point; and generating the first divided image and the second divided image, based on the at least one cluster.

6. The method for image registration of claim 5, wherein the generating the first divided image and the second divided image, based on the at least one cluster comprises:

determining a major cluster having the highest density of the at least one first matching point among the at least one cluster;

determining first area information on an area in which the major cluster is disposed in the first sub image, and determining second area information on an area in which the major cluster is disposed in the second sub image; and generating the first divided image from the first image using the first area information, and generating the second divided image from the second image using the second area information.

7. The method for image registration of claim 6, wherein the first area information comprises information on a first coordinate point corresponding to the center of the major cluster in the first sub image and information on a size at which the major cluster is disposed, the second area information comprises information on a second coordinate point corresponding to the center of the major cluster in the second sub image and information on a size at which the major cluster is disposed.

8. The method for image registration of claim 5, wherein the preprocessing process further comprises:

when the at least one cluster is generated, removing a shortage cluster in which the number of the at least one first matching point is less than the preset number from each of the first sub image and the second sub image; and, wherein the generating the first divided image and the second divided image, based on the at least one cluster comprises:

determining third area information on an area in which the at least one cluster is disposed in the first sub image from which the shortage cluster is removed, and determining fourth area information on an area in which the at least one cluster is disposed in the second sub image from which the shortage cluster is removed; and generating the first divided image from the first image using the third area information, and generating the second divided image from the second image using the fourth area information.

9. The method for image registration of claim 8, wherein the third area information comprises information on at least one third coordinate point corresponding to the center of each of the at least one cluster and information on a size in which each of the at least one cluster is disposed in the first sub image from which the shortage cluster is removed, the fourth area information comprises information on at least one fourth coordinate point corresponding to the center of each of the at least one cluster and information on a size in which each of the at least one cluster is disposed in the second sub image from which the shortage cluster is removed.

10. The method for image registration of claim 5, generating at least one cluster in each of the first sub image and the second sub image by performing clustering on the at least one first matching point comprises:

generating the at least one cluster in each of the first sub image and the second sub image according to a density-based clustering (Density-based spatial clustering of applications with noise, DBSCAN) technique using the density of the at least one first matching point.

11. The method for image registration of claim 5, generating at least one cluster in each of the first sub image and the second sub image by performing clustering on the at least one first matching point comprises:

generating at least one cluster in each of the first sub image and the second sub image according to a K-means clustering technique which enables forming a cluster consisting of the at least one first matching point.

12. The method for image registration of claim 1, wherein the registering the first image and the second image, based on the first divided image and the second divided image comprises:
   extracting at least one third feature point from the first divided image, and extracting at least one fourth feature point from the second divided image;
   calculating a matching parameter, based on at least one second matching point matched by comparing the at least one third feature point and the at least one fourth feature point;
   warping the second image, based on the matching parameter; and
   registering the first image and a warped second image.

13. The method for image registration of claim 12, wherein the extracting at least one third feature point from the first divided image, and extracting at least one fourth feature point from the second divided image comprises:
   repeatedly performing the preprocessing process until each of the first divided image and the second divided image can be inputted into a neural network-based feature point extraction model.

14. The method for image registration of claim 1, wherein when performing the preprocessing, the generating a first divided image and a second divided image from each of the first image and the second image through a preprocessing process comprises:
   determining a size of the first divided image; and
   generating the second divided image to correspond to the size of the first divided image, based on the size of the first divided image.

15. A non-transitory computer readable medium storing a computer program, wherein the computer program performs the following method for registering image when executed by one or more processors, the method comprising:
   determining whether to perform preprocessing on a first image and a second image, based on at least one of the number of first pixels of the first image or the number of second pixels of the second image;
   when performing the preprocessing, generating a first divided image and a second divided image from each of the first image and the second image through a preprocessing process; and
   registering the first image and the second image, based on the first divided image and the second divided image,
   wherein the preprocessing process comprises:
   generating a first sub image by reducing the first image to a preset size, and generating a second sub image by reducing the second image to a preset size;
   extracting at least one first feature point from the first sub image, and extracting at least one second feature point from the second sub image;
   determining at least one first matching point matched by comparing the at least one first feature point and the at least one second feature point; and
   generating the first divided image from the first image and generating the second divided image from the second image, based on the at least one first matching point; and
   wherein the at least one first matching point is determined, removing remaining feature points other than the at least one first matching point from each of the first sub image and the second sub image;
   and,
   wherein the generating the first divided image from the first image and generating the second divided image from the second image, based on the at least one first matching point comprises:
   generating the first divided image from the first image based on the first sub image from which the remaining feature points have been removed, and
   generating the second divided image from the second image based on the second sub image from which the remaining feature points have been removed.

16. A server, comprising:
   a network unit receiving a plurality of images;
   a storage unit storing the plurality of images; and
   a processor determining whether to perform preprocessing on a first image and a second image, based on at least one of the number of first pixels of the first image or the number of second pixels of the second image;
   wherein the processor is further configured to:
   when performing the preprocessing, generating a first sub image by reducing the first image to a preset size, and generating a second sub image by reducing the second image to a preset size through a preprocessing process,
   extracting at least one first feature point from the first sub image, and extracting at least one second feature point from the second sub image,
   determining at least one first matching point matched by comparing the at least one first feature point and the at least one second feature point,
   generating a first divided image from the first image and generating a second divided image from the second image, based on the at least one first matching point,
   when the at least one first matching point is determined, removing remaining feature points other than the at least one first matching point from each of the first sub image and the second sub image, and
   registering the first image and the second image based on the first divided image and the second divided image,
   and,
   wherein the generating the first divided image from the first image and generating the second divided image from the second image, based on the at least one first matching point comprises:
   generating the first divided image from the first image based on the first sub image from which the remaining feature points have been removed, and
   generating the second divided image from the second image based on the second sub image from which the remaining feature points have been removed.

* * * * *